US012549890B2

(12) United States Patent
Kneilling et al.

(10) Patent No.: US 12,549,890 B2
(45) Date of Patent: Feb. 10, 2026

(54) LOUDSPEAKER ARRANGEMENT

(71) Applicant: Harman Becker Automotive Systems Gmbh, Karlsbad (DE)

(72) Inventors: Maximilian Josef Kneilling, Hohenried (DE); Péter Tamás Podlócz, Debrecen (HU); Joerg Prokisch, Schwarzach (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 145 days.

(21) Appl. No.: 18/700,610

(22) PCT Filed: Oct. 15, 2021

(86) PCT No.: PCT/EP2021/078636
§ 371 (c)(1),
(2) Date: Apr. 11, 2024

(87) PCT Pub. No.: WO2023/061610
PCT Pub. Date: Apr. 20, 2023

(65) Prior Publication Data

US 2024/0397256 A1 Nov. 28, 2024

(51) Int. Cl.
*H04R 1/28* (2006.01)
*H04R 1/02* (2006.01)

(52) U.S. Cl.
CPC ........... *H04R 1/2896* (2013.01); *H04R 1/025* (2013.01); *H04R 2400/11* (2013.01)

(58) Field of Classification Search
CPC .. H04R 2499/13; H04R 1/2896; H04R 1/025; H04R 2400/11; H04R 1/2888; H04R 9/063
See application file for complete search history.

(56) References Cited

U.S. PATENT DOCUMENTS 5,253,301 A * 10/1993 Sakamoto ............ H04R 1/2826 381/89
5,388,162 A * 2/1995 Sohn ...................... H04R 1/227 181/146
7,796,775 B2 * 9/2010 Oxford .................... H04R 1/26 381/345

FOREIGN PATENT DOCUMENTS

DE 102018207077 A1 11/2019
EP 3726849 A1 10/2020

OTHER PUBLICATIONS

International Search Report dated Jul. 1, 2022 for PCT Appn. No. PCT/EP2021/078636 filed Oct. 15, 2021, 16 pgs.

* cited by examiner

*Primary Examiner* — Matthew A Eason
(74) *Attorney, Agent, or Firm* — BROOKS KUSHMAN P.C.

(57) ABSTRACT

A loudspeaker arrangement comprises a first loudspeaker comprising a first sound radiating surface and a first speaker basket, and a second loudspeaker comprising a second sound radiating surface and a second speaker basket. The first loudspeaker and the second loudspeaker are arranged opposite each other in a first direction. A cavity is formed between a front side of the first loudspeaker and a front side of the second loudspeaker. The first loudspeaker basket is directly coupled to the second loudspeaker basket, thereby forming a third projection that defines an opening of the cavity. The third projection forms a first point of contact on a first side of the loudspeaker arrangement. The first loudspeaker basket and the second loudspeaker basket further form at least one additional point of contact at a second side of the loudspeaker arrangement, opposite the first side in a second direction.

20 Claims, 8 Drawing Sheets

LOUDSPEAKER ARRANGEMENT

CROSS-REFERENCE TO RELATED APPLICATIONS

This application is the U.S. National Phase of PCT Application No. PCT/EP2021/078636 filed on Oct. 15, 2021, the disclosure of which is hereby incorporated in its entirety by reference herein.

TECHNICAL FIELD

The disclosure relates to a loudspeaker arrangement, in particular to a loudspeaker arrangement within a housing.

BACKGROUND

Loudspeaker arrangements usually comprise a plurality of different components. A loudspeaker enclosure usually accommodates one or more loudspeakers. The loudspeaker enclosure may be mounted to a wall or, e.g., to a panel in a passenger compartment of a vehicle. The loudspeaker enclosure often is screwed to a wall or a panel, for example. Due to the movement of the loudspeaker membranes, magnets, or any other movable elements within a loudspeaker, other elements such as a loudspeaker enclosure may also be excited and vibrate. Further, different parts and elements of the loudspeaker arrangement may be excited and bump or grate against each other. Vibrations of the loudspeaker arrangement may further be transferred to other parts and elements that are directly or indirectly connected to the loudspeaker arrangement such as, e.g., wall panels or other elements that are arranged close to the loudspeaker arrangement in a vehicle. This may result in unwanted noise which may worsen the sound experience for a user.

SUMMARY

A loudspeaker arrangement includes a first loudspeaker including a first sound radiating surface and a first speaker basket, and a second loudspeaker including a second sound radiating surface and a second speaker basket. The first loudspeaker and the second loudspeaker are arranged opposite each other in a first direction. A cavity is formed between a front side of the first loudspeaker and a front side of the second loudspeaker. The first loudspeaker basket is directly coupled to the second loudspeaker basket, thereby forming a third projection that defines an opening of the cavity. The third projection forms a first point of contact on a first side of the loudspeaker arrangement. The first loudspeaker basket and the second loudspeaker basket further form at least one additional point of contact at a second side of the loudspeaker arrangement, opposite the first side in a second direction, wherein the second direction is perpendicular to the first direction. The first point of contact is configured to accommodate a first elastic cord, wherein the first elastic cord, when arranged on the first point of contact, forms a closed loop in a vertical plane that is perpendicular to the second direction, and each of the at least one additional point of contact is configured to accommodate a second elastic cord and a third elastic cord such that each of the second elastic cord and the third elastic cord, when arranged on the respective additional point of contact, form a closed loop, the closed loop forming an opening that is arranged in a plane that is arranged at an angle of between 70° and 90° with respect to a vertical plane defined by the first direction and the second direction.

Other systems, methods, features and advantages will be or will become apparent to one with skill in the art upon examination of the following detailed description and figures. It is intended that all such additional systems, methods, features and advantages be included within this description, be within the scope of the invention and be protected by the following claims.

BRIEF DESCRIPTION OF THE DRAWINGS

The arrangement may be better understood with reference to the following description and drawings. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
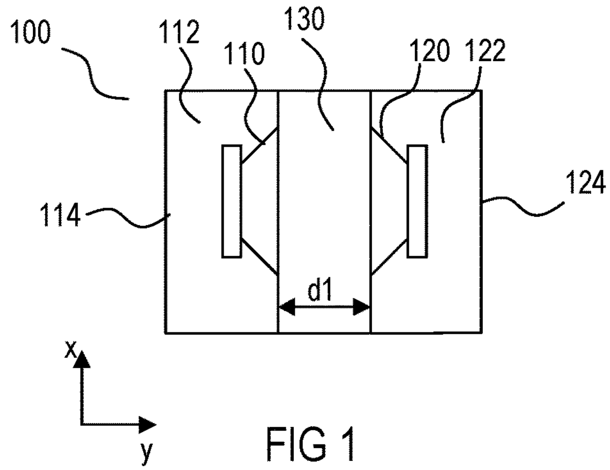
FIG. 1 schematically illustrates a cross-sectional view of a loudspeaker arrangement.

Referring to FIG. 1, a loudspeaker arrangement 100 is schematically illustrated. In particular, FIG. 1 schematically illustrates a cross-sectional view of a loudspeaker arrangement 100. The loudspeaker arrangement 100 comprises a first loudspeaker 110 and a second loudspeaker 120. The first loudspeaker 110 comprises a first sound radiating surface (e.g., a first membrane), and the second loudspeaker 120 comprises a second sound radiating surface (e.g., a second membrane). The first loudspeaker 110 and the second loudspeaker 120 are arranged opposite each other in a first direction y. That is, a first side of the first sound radiating surface is arranged opposite to and faces a first side of the second sound radiating surface. The first sound radiating surface is arranged essentially parallel to the second sound radiating surface. A distance d1 between the first loudspeaker 110 and the second loudspeaker 120 may be between 1 cm and 20 cm, for example. The distance d1 between the first loudspeaker 110 and the second loudspeaker 120 may depend on the size of the loudspeakers 110, 120, for example.

A first cavity 130 is formed between a front side of the first loudspeaker 110 and a front side of the second loudspeaker 120. The first loudspeaker 110 and the second loudspeaker 120 may radiate sound into the first cavity 130. The first cavity 130 may comprise an opening through which sound generated by the first loudspeaker 110 and sound generated by the second loudspeaker 120 may exit the first cavity 130 towards the environment. Such an opening, however, is not specifically illustrated in the cross-sectional view of FIG. 1.

The loudspeaker arrangement 100 may further comprise an enclosure comprising a first enclosure part 114 and a second enclosure part 124. The first enclosure part 114 forms a first sealed cavity 112 surrounding a back side of the first loudspeaker 110. The second enclosure part 124 forms a second sealed cavity 122 surrounding the back side of the second loudspeaker 120.

Figure 2:
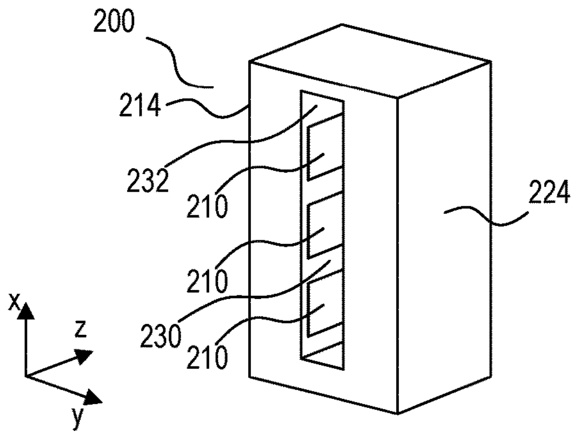
FIG. 2 schematically illustrates a dimensional view of another loudspeaker arrangement.

The loudspeaker arrangement 100 may, e.g., be mounted into a wall or in a vehicle. The loudspeaker arrangement 100 illustrated in FIG. 1 comprises one pair of loudspeakers, the pair of loudspeakers including the first loudspeaker 110 and the second loudspeaker 120. This, however, is only an example. It is also possible that a loudspeaker arrangement comprises more than one pair of loudspeakers. This is exemplarily illustrated in FIG. 2 which schematically illustrates a dimensional view of a loudspeaker arrangement 200. The loudspeaker arrangement 200 illustrated in FIG. 2 comprises three pairs of loudspeakers, each pair of loudspeakers formed by a first loudspeaker 210 and a second loudspeaker (second loudspeaker not visible in the dimensional view of FIG. 2). Any other number of loudspeaker pairs, however, is also possible.

Each pair of loudspeakers may be arranged similarly to what has been described with respect to the loudspeaker pair of FIG. 1 above. The first cavity 230 may be formed continuously between all pairs of loudspeakers, for example. The first enclosure part 214 may enclose all first loudspeakers 210 and form a continuous closed cavity at the back side of the first loudspeakers 210. However, it is also possible that a separate closed cavity is formed at the back side of each of the first loudspeakers 210. The same applies for the second loudspeakers and the second enclosure part 224, which may form a single continuous closed cavity at the back side of the second loudspeakers, or separate closed cavities for each of the second loudspeakers. The opening 232 of the first cavity 230 may face towards a second direction z which is perpendicular to the first direction y. If the loudspeaker arrangement 200 comprises two or more pairs of loudspeakers, the pairs of loudspeakers may be arranged successively in a third direction x, which is perpendicular to both the first direction y and the second direction z.

Figure 3:
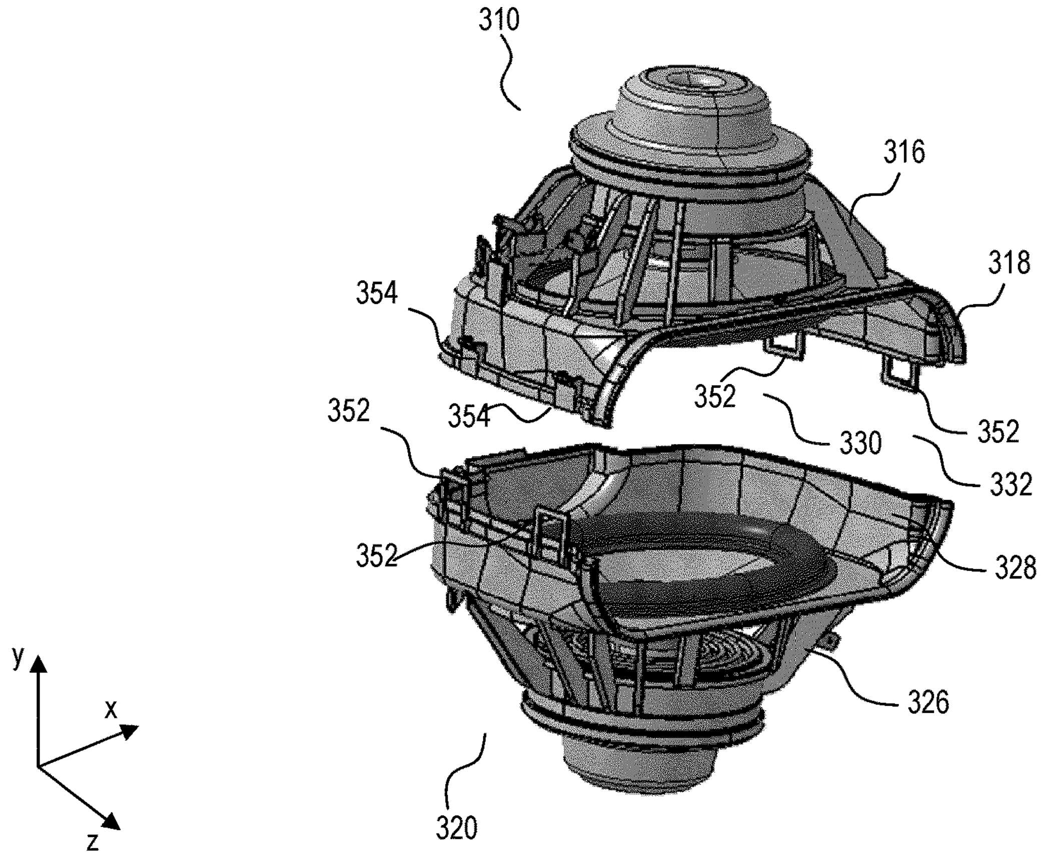
FIG. 3 schematically illustrates a dimensional view of loudspeakers of a loudspeaker arrangement in an unmounted state.

Now referring to the exploded three-dimensional view of FIG. 3, a first loudspeaker 310 and a second loudspeaker 320 are schematically illustrated in an unmounted state. A loudspeaker enclosure is not specifically illustrated in FIG. 3. The first loudspeaker 310 comprises a first loudspeaker basket 316, and the second loudspeaker comprises a second loudspeaker basket 326. According to one example, the first loudspeaker 310 and the second loudspeaker 320 may be arranged opposite each other in the first direction y and may be coupled to each other by first and second connection elements 352, 354. For example, the first loudspeaker 310 may comprise a plurality of first connection elements 352 and/or a plurality of second connection elements 354. The second loudspeaker 320 may also comprise a plurality of first connection elements 352 and/or a plurality of second connection elements 354, wherein each first connection element 352 of the second loudspeaker 320 forms a counterpart for a second connection element 354 of the first loudspeaker 310, and each second connection element 354 of the second loudspeaker 320 forms a counterpart for a first connection element 352 of the first loudspeaker 310. The first loudspeaker 310 may comprise a first projection 318. The first projection 318 may extend from the first loudspeaker 310, i.e., the first loudspeaker basket 316, in the first direction y towards the second loudspeaker 320. The first projection 318, in a plane defined by the second direction z and the third direction x, may at least partly surround the first sound radiating surface. As is schematically illustrated in FIG. 3, the first projection 318 may be omitted towards one side, in order to form the opening 332. The second loudspeaker 320 may comprise a second projection 328. The second projection 328 may extend from the second loudspeaker 320, i.e., the second loudspeaker basket 326, in the first direction y towards the first loudspeaker 310. The second projection 328, in a plane defined by the second direction z and the third direction x, may at least partly surround the second sound radiating surface. As is schematically illustrated in FIG. 3, the second projection 328 may be omitted towards one side, in order to form the opening 332. The first connection elements 352 and the second connection elements 354 may be arranged along the first projection 318 and the second projection 328, respectively. When the first loudspeaker 310 and the second loudspeaker 320 are coupled to each other, the first projection 318 and the second projection 328 may be coupled to each other, thereby connecting the first loudspeaker basket 316 to the second loudspeaker basket 326. The first cavity 330 may be defined by the first and the second projection 318, 328. That is, the first and the second projection 318, 328 partially surround the first cavity 330 in a plane defined by the second direction z and the third direction x.

According to one example, when the first loudspeaker 310 and the second loudspeaker 320 are mounted together (interconnected), each first counterpart 352 may engage with (e.g., snap into) one of the second counterparts 354 of the opposite loudspeaker 310, 320. This, however, is only an example. The first and second connection elements 352, 354, may be implemented in any suitable way and may comprise, e.g., brackets, pins, press fit pins, bolts, or screws. Any other suitable first and second connection elements 352, 354 are also possible. When a connection is formed between the first loudspeaker 310 and the second loudspeaker 320, the first cavity 330 is formed between the first loudspeaker 310 and the second loudspeaker 320, with an opening 332 formed towards the second direction z.

The first loudspeaker 310 and the second loudspeaker 320 during use (e.g., when the first sound radiating surface and the second sound radiating surface are excited in order to produce sound) both generate vibrations. By directly connecting the first loudspeaker basket 316 to the second loudspeaker basket 326, the vibrations of the two loudspeakers 310, 320 cancel each other out. This is because both loudspeakers 310, 320 generally receive the same sound signal and produce the same sound at the same time. That is, both loudspeakers 310, 320 vibrate simultaneously. By mounting the loudspeakers 310, 320 to face each other, the vibrations are inverse to each other and, therefore, counteract each other. In this way, the resulting vibrations of the loudspeaker arrangement 300 comprising the first loudspeaker 310 and the second loudspeaker 320, are zero or at least close to zero. Therefore, almost zero vibration is transferred to any surround parts such as a loudspeaker enclosure, for example.

Figure 4:
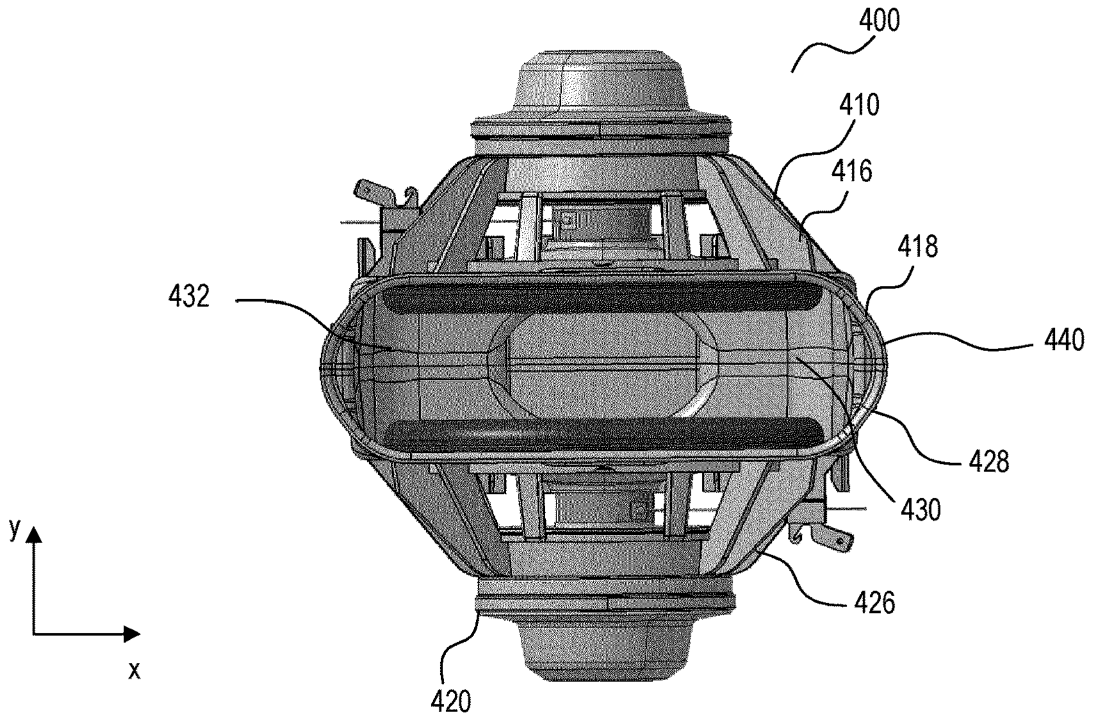
FIG. 4 schematically illustrates a front view of loudspeakers of an exemplary loudspeaker arrangement.

A first loudspeaker 410 and a second loudspeaker 420 in a mounted state are exemplarily illustrated in the front view of FIG. 4. When the first loudspeaker 410 is connected to the second loudspeaker 420, a third projection 440 (also visible, e.g., in the three-dimensional view of FIG. 5) is formed by the first loudspeaker 410 and the second loudspeaker 420. The third projection 440 extends from the loudspeaker arrangement 400 in the second direction z. According to one example, the third projection 440 may be formed by the first loudspeaker basket 416 or the first projection 418 as well as by the second loudspeaker basket 426 or the second projection 428.

The third projection 440 may comprise, for example, a protruding edge or ledge. The third projection 440 may surround the opening 432 of the first cavity 430 in a plane defined by the second and third direction z, x, for example. As is schematically illustrated in FIG. 4, the opening 432 may have an elongated form (cross-section), for example, the opening 432 may be rectangular with rounded corners. Any other form (cross-section) of the opening 432, for example, is also possible such as, square, rectangular, rounded, or oval.

Figure 5:
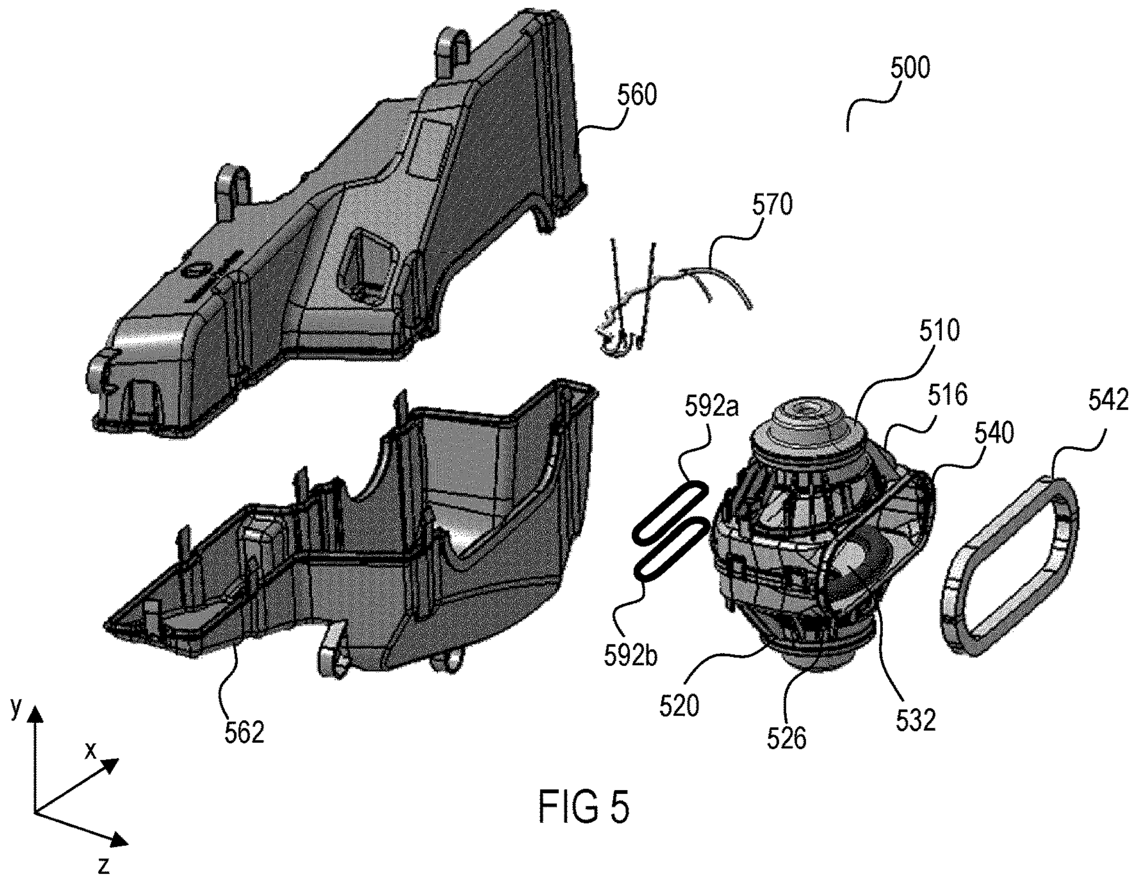
FIG. 5 schematically illustrates an exploded view of an exemplary loudspeaker arrangement in an unmounted state.

Now referring to FIG. 5, an exploded view of a loudspeaker arrangement 500 comprising a first loudspeaker 510, a second loudspeaker 520, a first enclosure part 560 and a second enclosure part 562 is schematically illustrated. When fully assembled, the first enclosure part 560 may be arranged to enclose the first loudspeaker 510 and the second enclosure part 562 may be arranged to enclose the second loudspeaker 520. The loudspeaker arrangement 500 comprising the first enclosure part 560 and the second enclosure part 562 in FIG. 5 is formed to fit into the interior of a vehicle. The general form of the enclosure and the individual enclosure parts 560, 562, however, may vary, depending on whether the loudspeaker arrangement 500 is arranged inside a vehicle, depending on which kind of vehicle the loudspeaker enclosure is arranged in, and/or depending on the position of the loudspeaker arrangement inside a vehicle, e.g., front part of the passenger compartment, rear part of the passenger compartment, trunk, etc.

As is illustrated in FIG. 5, a first elastic cord 542 may be arranged on the third projection 540, for example. That is, the first elastic cord 542 may be arranged to surround the third projection 540 and, therefore, also surrounds the opening 532 of the first cavity. The first elastic cord 542 may surround the third projection 540 such as for example a tire that surrounds a rim. The third projection 540 may comprise a notch or an indentation to receive the first elastic cord 542, to prevent the first elastic cord 542 from slipping off the projections. According to one example, the third projection comprises a so-called keder rail. When the enclosure parts 560, 562 are arranged to surround the loudspeakers 510, 520, the third projection 540 may be clamped between the first enclosure part 560 and the second enclosure part 562.

Figure 11:
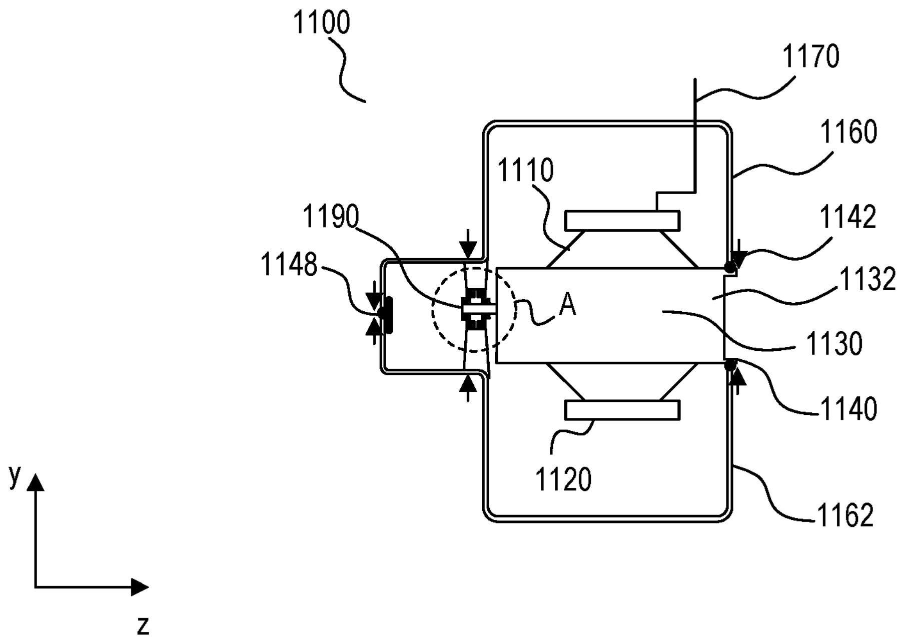
FIG. 11 schematically illustrates a cross-sectional view of an exemplary loudspeaker arrangement.

This is exemplarily illustrated in more detail in the cross-sectional view of FIG. 11. The first elastic cord 1142 is arranged to surround the third projection 1140. The first enclosure part 1160 and the second enclosure part 1162, when arranged to enclose the first loudspeaker 1110 and the second loudspeaker 1120, may form a first circumferential connection area arranged to surround and clamp the third projection 1140 such that the third projection 1140 is clamped between the first enclosure part 1160 and the second enclosure part 1162. In this way, the first loudspeaker 1110 and the second loudspeaker 1120 may be fixed inside the enclosure. The third projection 1140 forms a first point of contact between the loudspeakers 1110, 1120 and the enclosure. The arrows illustrated in FIG. 11 indicate the direction in which the first enclosure part 1160 and the second enclosure part 1162 exert pressure on the first loudspeaker basket 1116 and the second loudspeaker basket 1126.

Referring to FIGS. 5 and 11, the loudspeaker arrangement 500, 1100 further comprises at least one additional point of contact 1190 (additional point of contact not visible in the three-dimensional view of FIG. 5) between the loudspeakers 510, 1110, 520, 1120 and the enclosure. While the first point of contact is formed at a front side of the loudspeaker arrangement 500, 1100 (third projection 540, 1140), the front side being a side of the loudspeaker arrangement 500, 1100 at which the opening 532, 1132 is formed, the at least one additional point of contact 1190 is formed on a rear side of the loudspeaker arrangement 500, 1100, opposite the front side in the second direction z.

Figure 6:
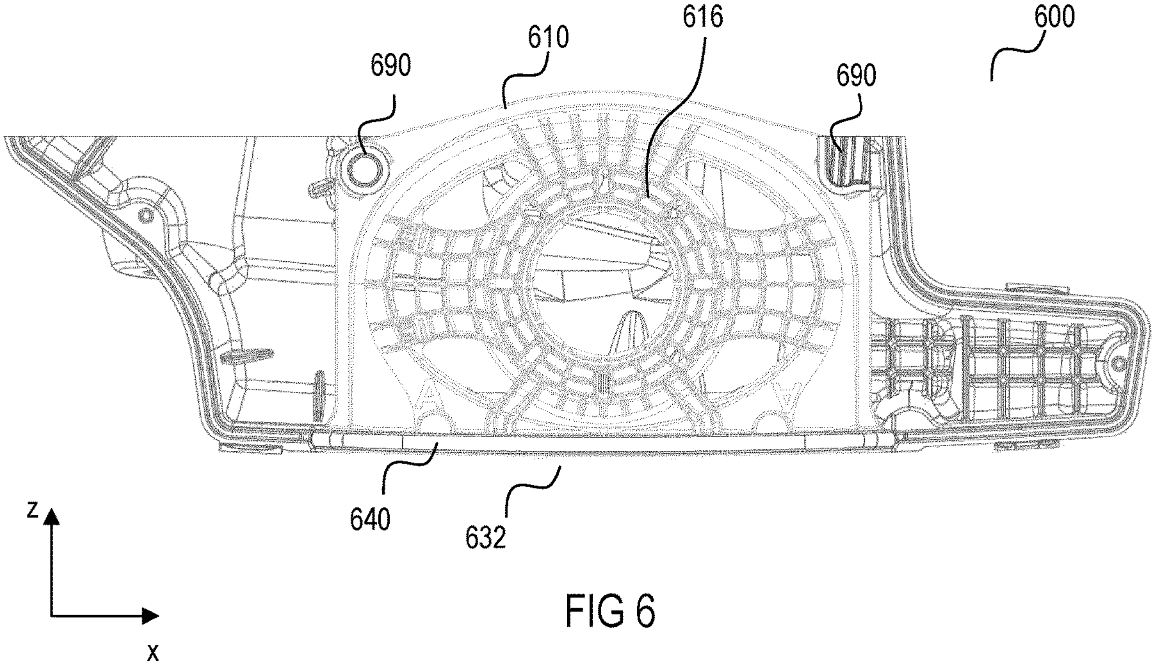
FIG. 6 schematically illustrates a top view of an exemplary loudspeaker arrangement.
Figure 7:
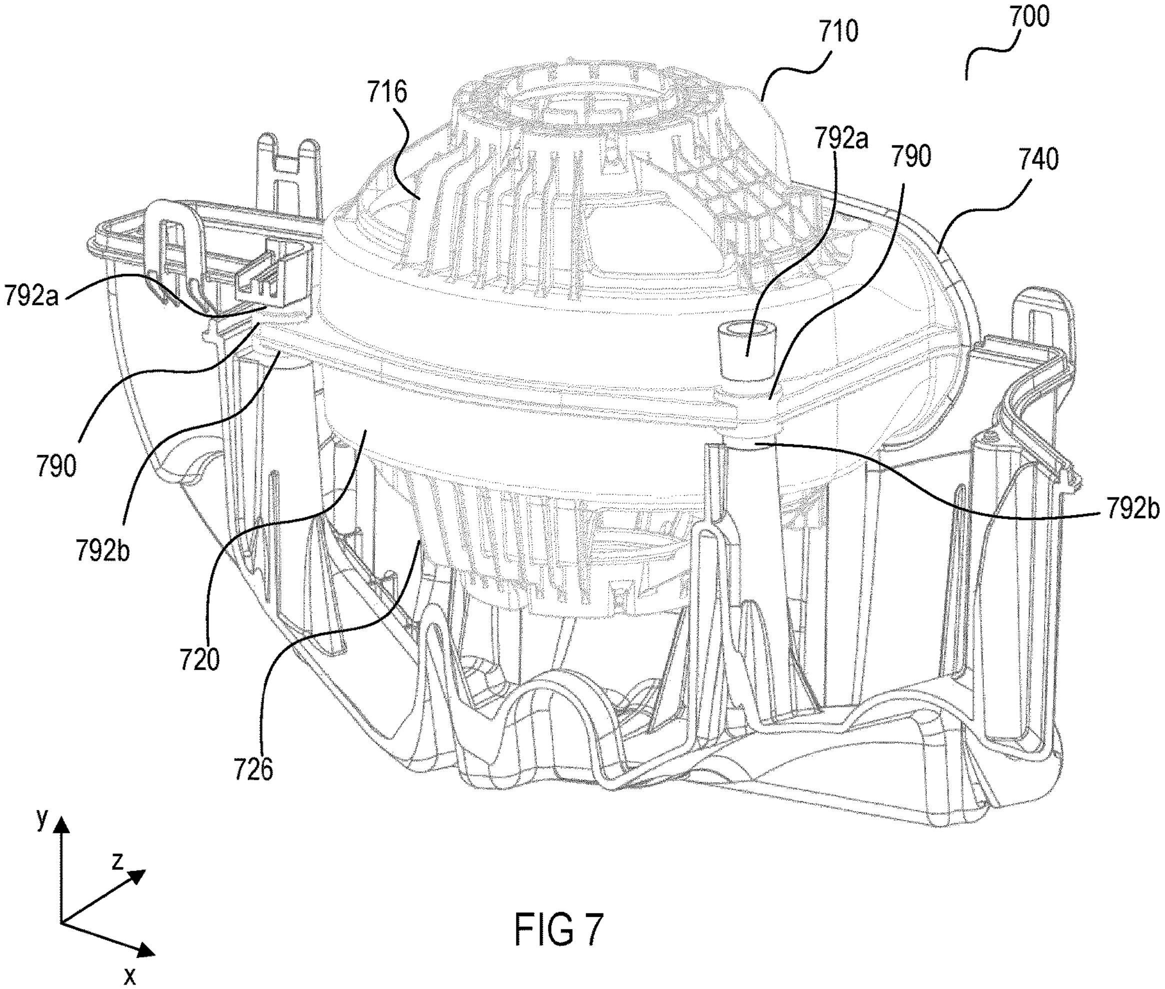
FIG. 7 schematically illustrates a three-dimensional view of an exemplary loudspeaker arrangement.
Figure 8:
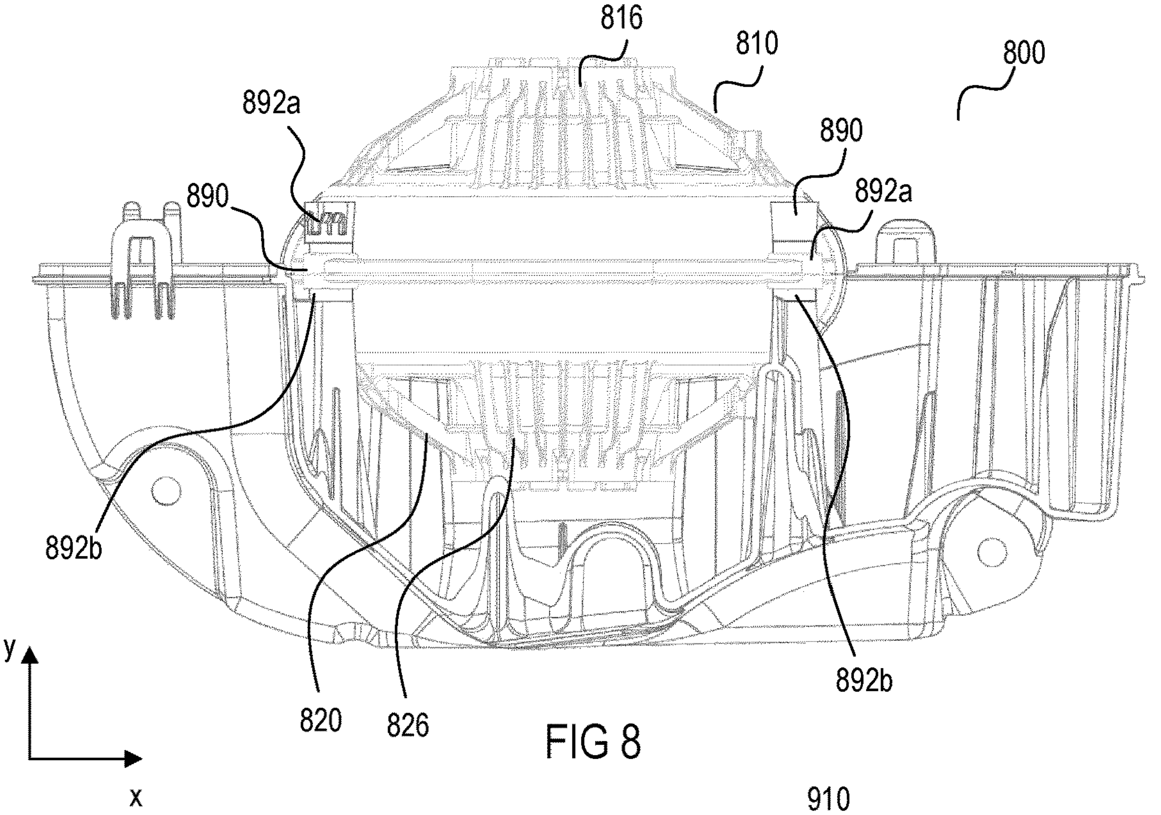
FIG. 8 schematically illustrates a rear view of an exemplary loudspeaker arrangement.
Figure 9:
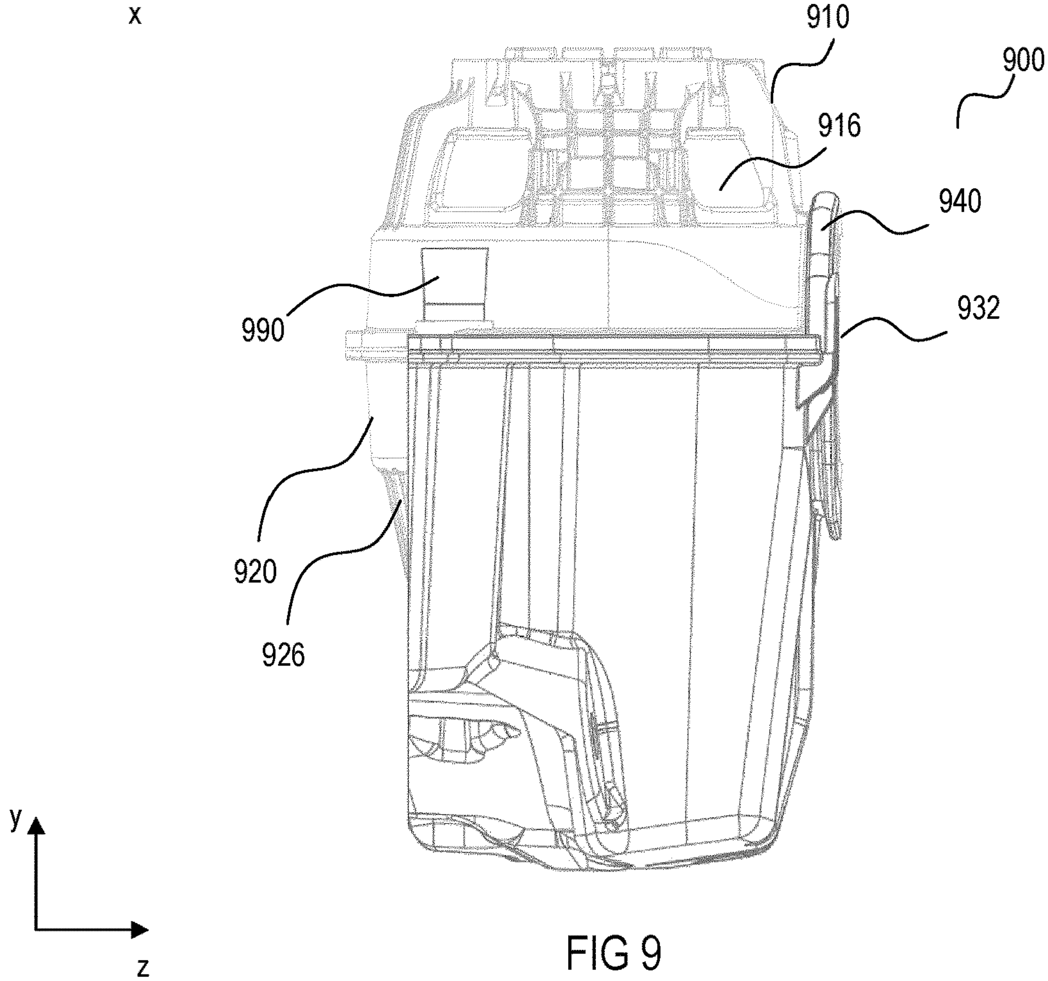
FIG. 9 schematically illustrates a side view of an exemplary loudspeaker arrangement.

An exemplary arrangement comprising at least one second points of contact 690, 790, 890, 990 at the rear side of the loudspeaker arrangement 600, 700, 800, 900 is schematically illustrated by the top view of FIG. 6, the three-dimensional view of FIG. 7, the rear view of FIG. 8 and the side view of FIG. 9. In the examples illustrated in FIGS. 6 to 9, the loudspeaker arrangement 600, 700, 800, 900 comprises exactly two second points of contact 690, 790, 890, 990. A first additional point of contact 690, 790, 890, 990 is arranged at a back side of the loudspeaker arrangement 600, 700, 800, 900 and on a first side of the first and second loudspeaker basket 616, 716, 726, 816, 826, 916, 926 in the third direction x. A second additional point of contact 690, 790, 890, 990 is arranged at the back side of the loudspeaker arrangement 600, 700, 800, 900 towards a second side of the first and second loudspeaker basket 616, 716, 726, 816, 826, 916, 926 in the third direction x, opposite the first side of the first and second loudspeaker basket 616, 716, 726, 816, 826, 916, 926 in the third direction x.

As is schematically illustrated in the arrangement of FIG. 5, it is generally also possible to arrange only a single additional point of contact (indicated as a second elastic cord 592*a* and a third elastic cord 592*b* in FIG. 5) in a central position at the rear side of the loudspeaker arrangement 600, 700, 800, 900. Providing only one additional point of contact 690, 790, 890, 990, and not more than one additional point of contact 690, 790, 890, 990, may reduce the overall costs of the loudspeaker arrangement, as only few components are needed to form the additional point of contact 690, 790, 890, 990. Such an arrangement however, may have increased space requirements in the second direction z, as the overall width of such an arrangement generally is the sum of a width of the third projection 540, a width of the loudspeaker baskets 516, 526, and a width of the additional point of contact in the second direction z. The arrangement of FIGS. 6 to 9 on the other hand, requires less space in the second direction z, as the second points of contact 690, 790, 890, 990 are moved towards the sides of the arrangement and may be arranged sideward of the first and second loudspeaker basket 616, 716, 726, 816, 826, 916, 926 to a certain degree. The width of the second points of contact 690, 790,

890, 990, therefore, does not, or at least only partly contribute to the overall width of the arrangement in the second direction z.

Generally, it is also possible that the arrangement only comprises the first additional point of contact 690, 790, 890, 990 or only the second additional point of contact 690, 790, 890, 990 of the arrangement of FIGS. 6 to 9. That is, the arrangement may comprise, for example, only the first additional point of contact 690, 790, 890, 990 arranged at the rear side of the arrangement and sideward of the first and second loudspeaker basket 616, 716, 726, 816, 826, 916, 926. No further points of contact between the loudspeakers 610, 620, 710, 720, 810, 820, 910, 920 and the enclosure are generally necessary. That is, the first loudspeaker 610, 710, 810, 910 and the second loudspeaker 620, 720, 820, 920 may be fixed inside the enclosure solely by clamping the third projection 640, 740, 840, 940 and a single additional point of contact 690, 790, 890, 990 between the first enclosure part 660, 760, 860, 960 and the second enclosure part 662, 762, 862, 962. In this way, the first loudspeaker 610, 710, 810, 910 and the second loudspeaker may be mechanically decoupled from the first enclosure part and the second enclosure part.

The arrangement comprising a single point of contact centrally at the rear side of the arrangement 500 (see, e.g., FIG. 5) or the arrangement comprising two essentially symmetrically arranged second points of contact 690, 790, 890, 990 of FIGS. 6 to 9, however, may provide an increased stability. According to another example, it is even possible that the arrangement comprises even more than two second points of contact 690, 790, 890, 990 arranged along the circumference of the first and second loudspeaker basket.

Referring to FIG. 11, and as has been described above (see also FIG. 3), most if not all vibrations generated during use of the loudspeakers 1110, 1120 are cancelled out by directly connecting the first loudspeaker 1110 (first loudspeaker basket not specifically illustrated in FIG. 11) to the second loudspeaker 1120 (second loudspeaker basket not specifically illustrated in FIG. 11). Any potentially remaining vibrations generated by the loudspeakers 1110, 1120 that are not cancelled out by directly connecting the first loudspeaker 1110 to the second loudspeaker 1120 may be at least partly damped or absorbed by suspending the loudspeakers 1110, 1120 within the loudspeaker enclosure (e.g., between first enclosure part 1160 and second enclosure part 1162).

Further, in the exemplary arrangements, the use of screws for fixing the loudspeakers 1110, 1120 inside the enclosure may be entirely avoided. In conventional arrangements, screws may become loose over time, as the material of the screws (e.g., metal) usually has a different thermal expansion coefficient than the material of the loudspeakers 1110, 1120 (e.g., plastic or glass fiber) and the material of the enclosure (e.g., plastic or glass fiber). The loosening of the screws may lead to unwanted clattering and rattling of the loudspeaker arrangement. Any unwanted noise and clattering may be avoided when fixing the loudspeakers 1110, 1120 inside the enclosure by clamping the third projection 1140 and the at least one additional point of contact 1190 between the first enclosure part 1160 and the second enclosure part 1162.

If elastic cords are arranged between the third projection 1140 and the enclosure parts 1160, 1162 (first elastic cord 1142) and between the at least one additional point of contact 1190 and each of the enclosure parts 1160, 1162 (as will be described in further detail below), any vibrations or excitations of the loudspeakers 1110, 1120 may be damped further. Vibrations of the first and second loudspeakers 1110, 1120, therefore, may be completely, or at least almost completely, reduced or avoided. Suspending the loudspeakers 1110, 1120 between the first enclosure part 1160 and the second enclosure part 1162, stiffens (strengthens) the enclosure walls, while at the same time dampening any remaining vibrations. Further, the inside of the enclosure may be sealed towards the outside by the first elastic cord 1142 arranged between the third projection 1140 and the first and second enclosure parts 1160, 1162.

Figure 10A:
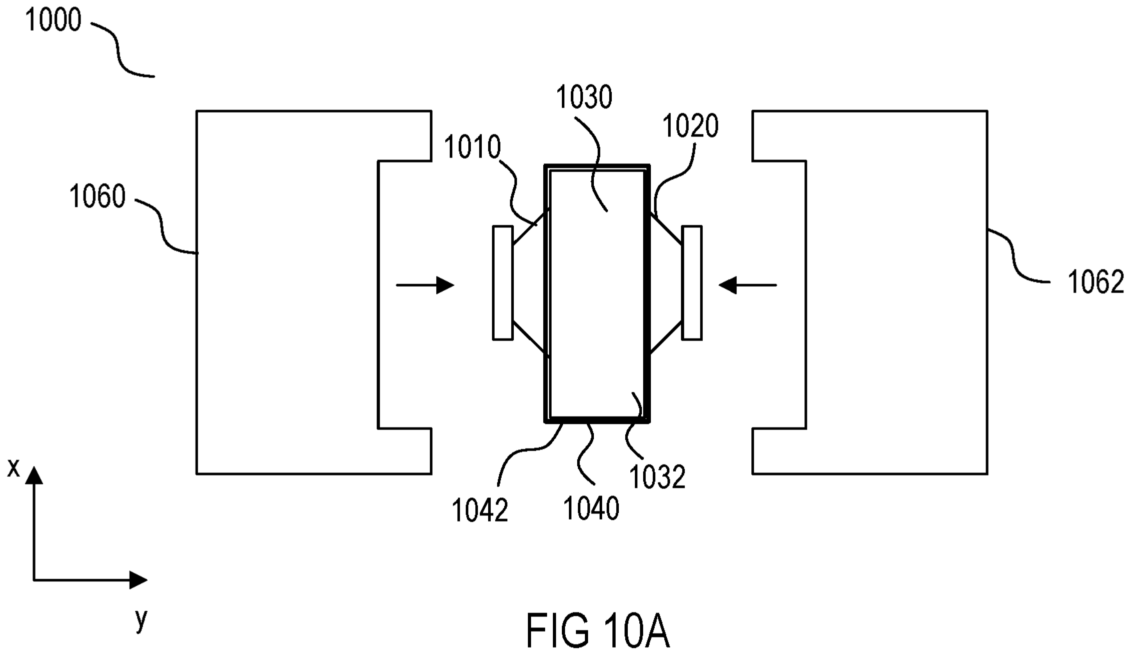
FIG. 10, including FIGS. 10A and 10B, schematically illustrates a front view of an exemplary loudspeaker arrangement in an unmounted and in a mounted state.
Figure 10B:
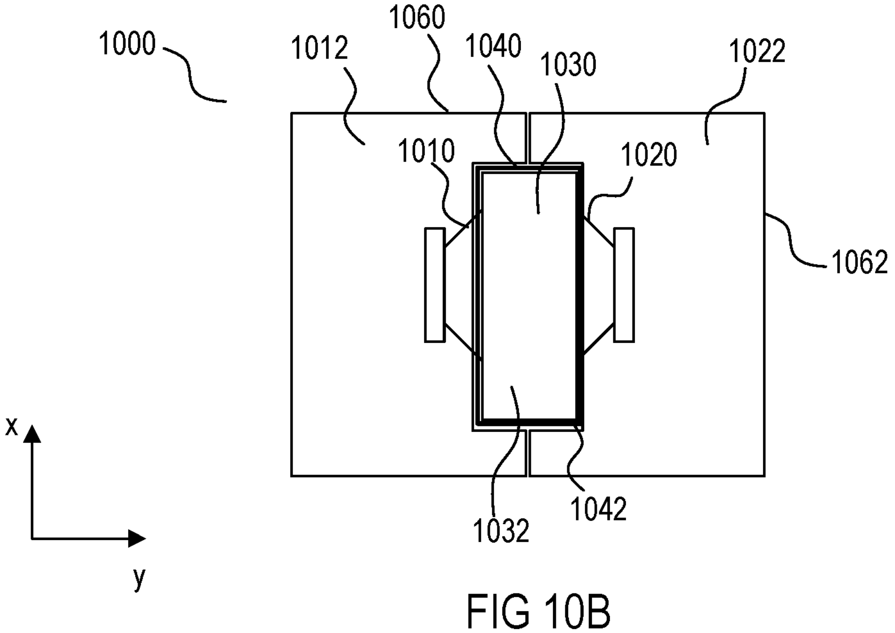

Now referring to the front views of FIGS. 10A and 10B, the basic principle of an exemplary loudspeaker arrangement is further illustrated. FIG. 10A illustrates a front view of a loudspeaker arrangement in an unmounted state, and FIG. 10B illustrates a front view of the loudspeaker arrangement in a mounted state. The first loudspeaker 1010 and the second loudspeaker 1020 are arranged opposite each other and a first cavity 1030 is formed between the front side of the first loudspeaker 1010 and the front side of the second loudspeaker 1020. A first enclosure part 1060 and a second enclosure part 1062 are arranged to enclose the first loudspeaker 1010 and the second loudspeaker 1020. In a mounted state, the first loudspeaker 1010 and the second loudspeaker 1020 are clamped between the first enclosure part 1060 and the second enclosure part 1062. In particular, the third projection 1040 and the at least one additional point of contact (additional point of contact not visible in the front view of FIG. 10) are clamped between the first enclosure part 1060 and the second enclosure part 1062. The first enclosure part 1060 may exert a pressure on the first loudspeaker 1010 (e.g., first loudspeaker basket, third projection), and the second enclosure part 1062 may exert a pressure on the second loudspeaker 1020 (e.g., second loudspeaker basket, third projection), for example, thereby pressing the first loudspeaker 1010 and the second loudspeaker 1020 towards each other. As has been described before, a first elastic cord 1042 may be arranged between the third projection 1040 and the first and the second enclosure parts 1060, 1062. The first enclosure part 1060 and the second enclosure part 1062 each may have a recess which forms a first circumferential connection area for clamping the third projection 1040.

When the first enclosure part 1060 and the second enclosure part 1062 are arranged to enclose the first loudspeaker 1010 and the second loudspeaker 1020, the first enclosure part 1060 may be fixed to the second enclosure part 1062. According to one example, the first enclosure part 1060 may be glued to the second enclosure part 1062 in the mounted state. For example, a adhesive (e.g., viscoplastic) or glue may be applied between the first enclosure part 1060 and the second enclosure part 1062. More specifically, for example, an adhesive or glue may be applied along a contact surface or contact area of the first enclosure part 1060 which is brought into contact with a contact surface or contact area of the second enclosure part 1062.

The loudspeaker arrangement may further include third connection elements that are configured to connect the first enclosure part to the second enclosure part. Each of a plurality of third connection elements may comprise for example, a screw, a bolt, a bracket, a pin, a hook, or a press-fit pin. A plurality of third connection elements may be evenly distributed around the enclosure and along the contact area between the first enclosure part and the second enclosure part to equally distribute the resulting holding force along the perimeter of the enclosure.

Again referring to FIG. 5, the first elastic cord 542 forms a closed loop around the opening 532, wherein the first elastic cord 542 is arranged upright. That is, an opening formed by the first elastic cord 542 is arranged in a vertical plane that is perpendicular to the second direction z. The at least one additional point of contact, on the other hand, is arranged in a horizontal plane, perpendicular to the first direction y. This will be described in further detail in the following with respect to FIG. 12, which illustrates a section A of the arrangement of FIG. 11. The additional point of contact 1290 comprises or is configured to accommodate a second elastic cord 1292*a*, and a third elastic cord 1292*b*. Each of the second and third elastic cords 1292*a*, 1292*b* forms a closed loop that is arranged in a horizontal plane. That is, an opening formed by each of the second elastic cord 1292*a* and the third elastic cord 1292*b* is arranged in a horizontal plane that is perpendicular to the first direction y. The first loudspeaker 1110 and the second loudspeaker 1120 (e.g., the first loudspeaker basket and the second loudspeaker basket) may form a projection 1298 extending in the third direction x. A first collar 1294*a* is formed on a first side of the projection 1298, the first side facing the first enclosure part 1160 in the mounted state of the arrangement 1100. The form of the first collar 1294*a* generally corresponds to the form of the second elastic cord 1292*a*. The dimensions of the second elastic cord 1292*a*, however, are smaller than the dimensions of the first collar 1294*a* such that the first elastic cord 1292*a* may be arranged inside the first collar 1294*a*. An exterior surface of the second elastic cord 1292*a*, however, contacts an interior surface of the first collar 1294*a*. In this way, the first collar 1294*a* prevents the second elastic cord 1292*a* from shifting in the horizontal plane defined by the second direction z and the third direction x. The first enclosure part 1260 comprises a second collar 1296*a*, having the same form but smaller dimensions than the second elastic cord 1292*a*. The second collar 1296*a* is inserted into the opening formed by the second elastic cord 1292*a* such that an exterior surface of the second collar 1296*a* contacts an interior surface of the second elastic cord 1292*a*.

A third elastic cord 1292*b* is arranged on a second side of the projection 1298, facing the second enclosure part 1262, opposite the first side. The third elastic cord 1292*b* is arranged inside a third collar 1294*b* formed on the projection 1298 and encloses a fourth collar 1296*b* of the second enclosure part 1262, similar to what has been described with respect to the second elastic cord 1292*a* above. As has been described above and as is schematically illustrated in FIG. 11, the first enclosure part 1160, 1260 and the second enclosure part 1162, 1262 exert a pressure on the first loudspeaker 1110 and the second loudspeaker 1120 such that the first loudspeaker 1110 and the second loudspeaker 1120 are pressed towards each other. The first enclosure part 1160, 1260 and the second enclosure part 1162, 1262, however, are not in direct contact with the first loudspeaker 1110 and the second loudspeaker 1120. The first, second and third elastic cords 1142, 1292*a*, 1292*b* are arranged between the enclosure parts 1160, 1162 and the loudspeakers 1110, 1120. In this way, any vibrations may be further damped or absorbed.

Figure 12:
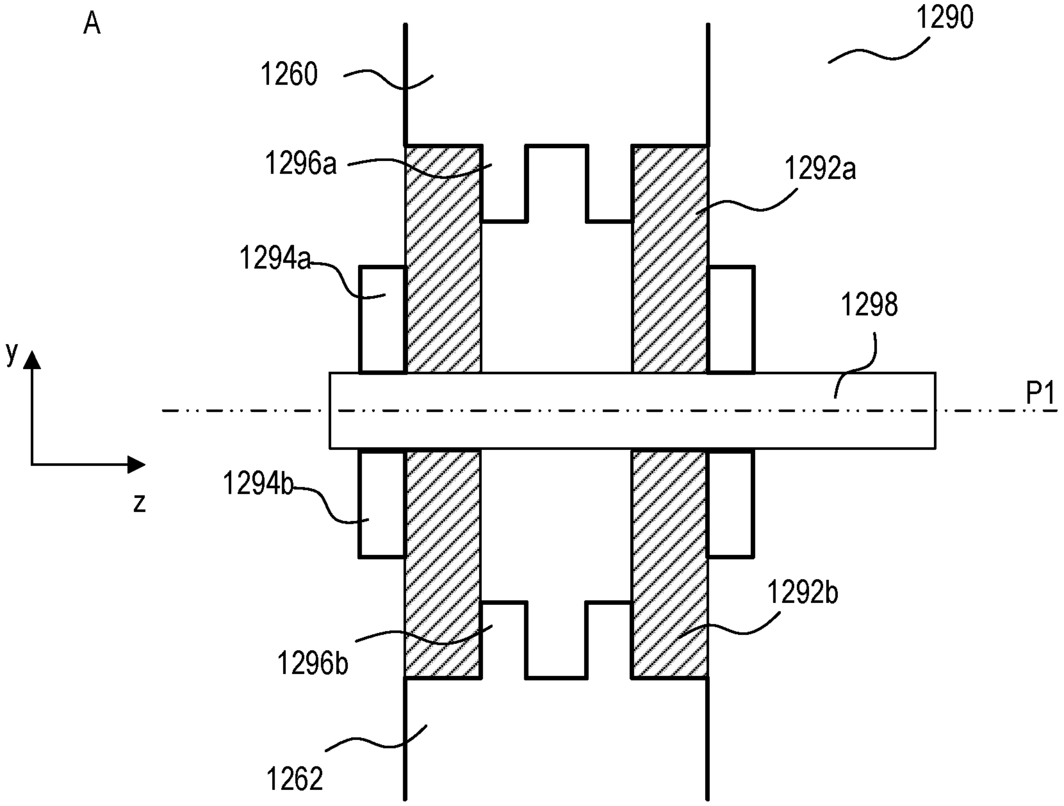
FIG. 12 schematically illustrates a section A of the arrangement of FIG. 11 in greater detail.

The arrangement of elastic cords and collars or projections that has been described with respect to FIG. 12 above prevents the different parts from shifting with regard to each other in a horizontal direction. The arrangement illustrated in FIG. 12, however, is only an example. It is also possible that the first collar 1294*a* having smaller dimensions than the second elastic cord 1292*a* is coupled to or formed by the first enclosure part 1160, while the second collar 1296*a* having larger dimensions than the second elastic cord 1292*a* is formed on or coupled to the projection 1298. The same applies for the third elastic cord 1292*b*, the third collar 1294*b*, and the fourth collar 1296*b*.

Figure 13:
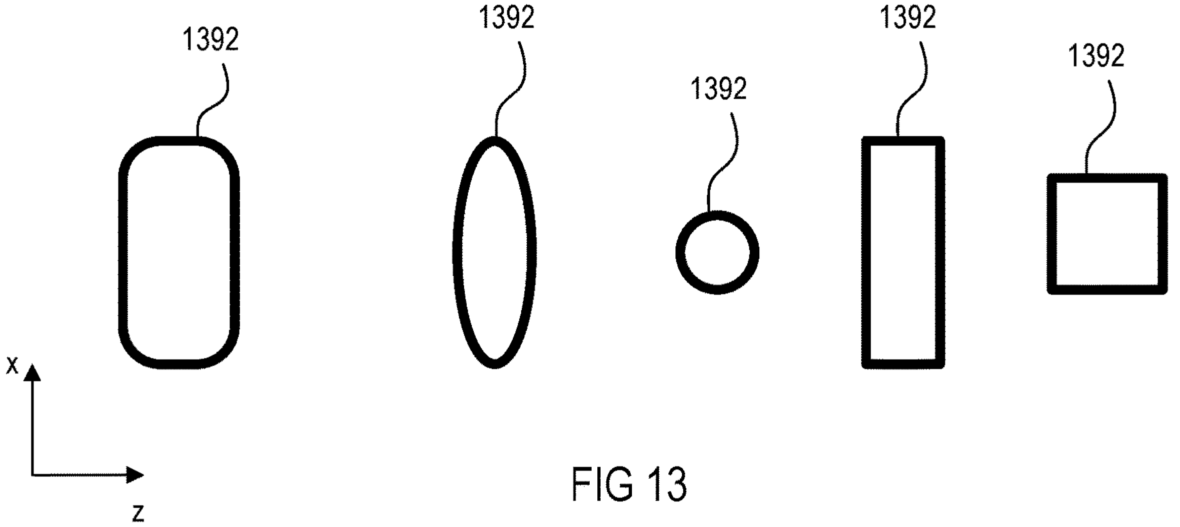
FIG. 13 schematically illustrates different shapes of exemplary elastic cords.

The second elastic cord 1292*a* and the third elastic cord 1292*b* may have any suitable form. Several different forms of second and third elastic cords 1392 such as rectangular with rounded edges, oval, round, rectangular and square, are schematically illustrated in FIG. 13. Such comparably simple forms allow to easily assemble the different parts. It is, however, also possible that the second elastic cord 1292*a* and the third elastic cord 1292*b* have other, more complex forms. This may increase the mechanical stability of the arrangement at the expense of a more complicated assembly process.

As can be seen from the above, the first enclosure part 1160 and the second enclosure part 1162 may not directly contact the first loudspeaker 1110 and the second loudspeaker 1120 (i.e., the at least one additional point of contact 1190), but only the first, second and third elastic cords that are arranged between the first and second enclosure parts 1160, 1162 and the first and second loudspeaker 1110, 1120, respectively.

According to one example, the first enclosure part and the second enclosure part each include a material such as polypropylene or glass fibre, for example. The first elastic cord and each of the second elastic cord and third elastic cord may comprise an elastic material that may be compacted or compressed up to a maximum of 50% of its original volume (e.g., original volume may correspond to when no pressure is exerted on the elastic cord). The first, second, and third elastic cords each may comprise, for example, an elastomer, sponge or foam rubber, or any other foam material.

The first loudspeaker and the second loudspeaker may be electrically coupled to components or elements arranged outside the enclosure, e.g., to a power supply such as a vehicle battery. A cable harness 570, 1170 for electrically coupling the first loudspeaker 510, 1110 and the second loudspeaker 520, 1120 to the outside of the enclosure is exemplarily illustrated in FIGS. 5 and 11. The enclosure may comprise an opening (not specifically illustrated) through which such a cable harness 570, 1170 may extend from the inside to the outside of the enclosure.

In the examples described above, each of the at least one additional point of contact 1190 is configured to accommodate a second elastic cord 592*a* and a third elastic cord 592*b* such that each of the second elastic cord 592*a* and the third elastic cord 592*b*, when arranged on the respective additional point of contact 1190, form, for example, a closed loop, the closed loop forming an opening that is arranged in a horizontal plane that is perpendicular to the first direction y.

Figure 14:
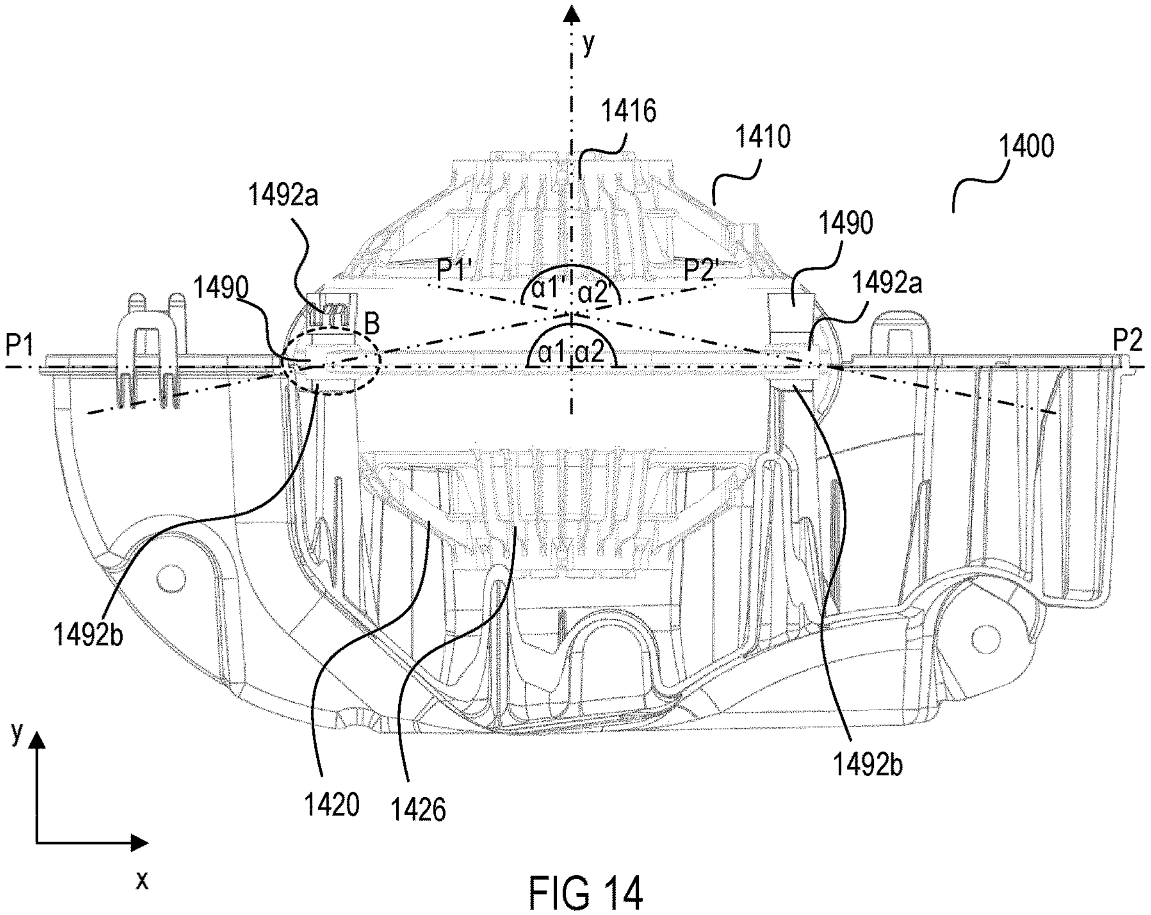
FIG. 14 schematically illustrates a rear view of another exemplary loudspeaker arrangement.
Figure 15:
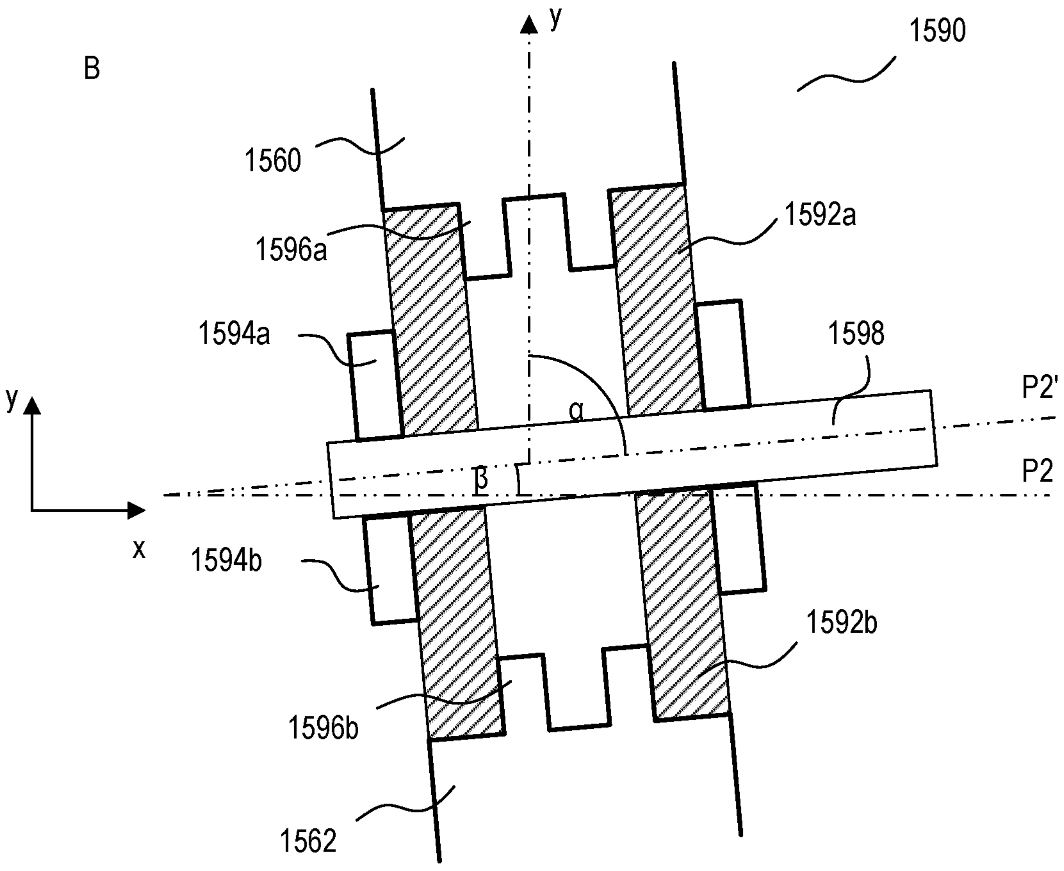
FIG. 15 schematically illustrates a section B of the arrangement of FIG. 14 in greater detail.

According to another example which is schematically illustrated in FIGS. 14 and 15, the closed loops formed by the second elastic cord 1492*a* and the third elastic cord 1492*b* may form an opening that is arranged in a plane P1', P2' that is tilted with respect to the horizontal plane P1, P2. If the opening formed by the first and the second elastic cord 1492*a*, 1492*b* is arranged in the horizontal plane P1, P2, this results in an angle $\alpha 1$, $\alpha 2$ of 90° formed between the horizontal plane P1, P2 and a vertical plane defined by the first direction y and the second direction z. If the opening formed by the first and the second elastic cord 1492*a*, 1492*b* is arranged in a plane P1', P2' that is tilted or inclined with respect to the horizontal plane P1, P2, this results in an angle $\alpha 1'$, $\alpha 2'$ of less than 90° formed between the respective plane P1', P2' and the vertical plane defined by the first direction y and the second direction z. This resulting angle $\alpha 1'$, $\alpha 2'$ may be between 80° and 90°, for example, or even between 70° and 90°. In other words, a resulting angle $\beta$ between the inclined plane P2' and the horizontal plane P2 (see FIG. 15) may be between 0° and 20°. The horizontal plane P1, P2 is defined by the horizontal directions x, z and is perpendicular to the vertical direction y.

The elastic cords 1492*a*, 1492*b* of different second points of contact 1490 may be inclined in opposite directions, as is schematically illustrated in FIG. 14. In this way, the opposite inclinations basically cancel each other out, such that the first and second loudspeaker 1410, 1420 are still securely held in their desired positions. In the example illustrated in FIG. 14, the inclination is the same for each of the two second points of contacts 1490. That is, $\alpha1'=\alpha2'$. This, however, is only an example. It is also possible that $\alpha1'=\alpha2'\pm5°$. In this way, the inclinations do not cancel each other out completely, but still sufficiently provide a robust loudspeaker arrangement 1400.

If the elastic cords 1492*a*, 1492*b* are tilted as explained above, the projection 1598 may also extend parallel to the respective plane P2' (see FIG. 15). In this way, the first collar 1594*a* and the third collar 1594*b* may also be tilted accordingly in order to be able to securely hold the elastic cords 1592*a*, 1592*b* in their desired tilted positions. The second collar 1596*a* and the fourth collar 1596*b* may also be tilted accordingly.

The loudspeakers described above may be any transducers configured to convert electrical signals into sound waves. For example, a loudspeaker may include a diaphragm attached to and driven by a voice coil, such as in a dynamic driver setup, a balanced armature setup, etc. When an electrical signal is applied to the loudspeaker, a mechanical force causes the diaphragm to move back and forth, thereby reproducing sound under the control of the applied electrical signal. It is, however, also possible that at least one (but not all) of the loudspeakers is or comprises a passive membrane. A passive membrane is a membrane that is stimulated through changes in the surrounding pressure only. No actuators are used for its stimulation.

The first, second and third direction x, y, z are used throughout the description for illustrative purposes only. The directions are not meant to be defined with regard to a ground surface. Rather, the directions are merely used to illustrate the orientation of the different elements and their arrangement with regard to each other. When mounted into a wall or inside a vehicle, the described loudspeaker arrangement may be rotated into any suitable position resulting in any suitable orientation.

While various embodiments of the invention have been described, it will be apparent to those of ordinary skill in the art that many more embodiments and implementations are possible within the scope of the invention. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof. Accordingly, the invention is not to be restricted except in light of the attached claims and their equivalents.

The description of embodiments has been presented for purposes of illustration and description. Suitable modifications and variations to the embodiments may be performed in light of the above description or may be acquired from practicing the methods. The described arrangements are exemplary in nature, and may include additional elements and/or omit elements. As used in this application, an element recited in the singular and proceeded with the word "a" or "an" should be understood as not excluding plural of said elements, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The described systems are exemplary in nature, and may include additional elements and/or omit elements. The subject matter of the present disclosure includes all novel and non-obvious combinations and sub-combinations of the various systems and configurations, and other features, functions, and/or properties disclosed. The following claims particularly point out subject matter from the above disclosure that is regarded as novel and non-obvious.

The invention claimed is:

1. A loudspeaker arrangement comprising:

a first loudspeaker comprising a first sound radiating surface and a first speaker basket, and a second loudspeaker comprising a second sound radiating surface and a second speaker basket, wherein, the first loudspeaker and the second loudspeaker are arranged opposite each other in a first direction;

a cavity is formed between a front side of the first loudspeaker and a front side of the second loudspeaker;

the first loudspeaker basket is directly coupled to the second loudspeaker basket, thereby forming a third projection that defines an opening of the cavity;

the third projection forms a first point of contact on a first side of the loudspeaker arrangement;

the first loudspeaker basket and the second loudspeaker basket further form at least one additional point of contact at a second side of the loudspeaker arrangement, opposite the first side in a second direction, wherein the second direction is perpendicular to the first direction;

the first point of contact is configured to accommodate a first elastic cord, wherein the first elastic cord, when arranged on the first point of contact, forms a first closed loop in a vertical plane that is perpendicular to the second direction; and each of the at least one additional point of contact is configured to accommodate a second elastic cord and a third elastic cord such that each of the second elastic cord and the third elastic cord, when arranged on the respective additional point of contact, form a second closed loop, the second closed loop forming an opening that is arranged in a plane that is arranged at an angle of between 70° and 90° with respect to a vertical plane defined by the first direction and the second direction.

2. The loudspeaker arrangement of claim 1, wherein the first loudspeaker basket comprises a first projection extending from the first loudspeaker basket in the first direction towards the second loudspeaker;

the second loudspeaker basket comprises a second projection extending from the second loudspeaker basket in the first direction towards the first loudspeaker; and the first projection is directly coupled to the second projection, thereby defining the cavity between the front side of the first loudspeaker and the front side of the second loudspeaker.

3. The loudspeaker arrangement of claim 1, further comprising:

a loudspeaker enclosure comprising a first enclosure part arranged to enclose a rear side of the first loudspeaker, and a second enclosure part arranged to enclose a rear side of the second loudspeaker and to be connected to the first enclosure part, wherein:

when the first enclosure part and the second enclosure part are arranged to enclose the first and the second loudspeaker, the third projection and each of the at least one additional point of contact are clamped between the first enclosure part and the second enclosure part.

4. The loudspeaker arrangement of claim 1 wherein the first elastic cord is mounted on the third projection to circumferentially surround the third projection, and when a first enclosure part and a second enclosure part are arranged to enclose the first and the second loudspeaker, the first elastic cord is arranged between the third projection and the enclosure.

5. The loudspeaker arrangement of claim 1, wherein each of the at least one additional point of contact comprises a projection extending in parallel to the respective plane; a first collar arranged on a first side of the projection and the second elastic cord, wherein a form of the first collar corresponds to the form of the second elastic cord, and wherein either the dimensions of the second elastic cord are smaller than the dimensions of the first collar and the second elastic cord is arranged inside the first collar such that an exterior surface of the second elastic cord contacts an interior surface of the first collar, or the dimensions of the second elastic cord are greater than the dimensions of the first collar and the second elastic cord is arranged outside of the first collar such that an interior surface of the second elastic cord contacts an exterior surface of the first collar; and a third collar arranged on a second side of the projection opposite the first side in the first direction, and the third elastic cord, wherein a form of the third collar corresponds to the form of the third elastic cord, and wherein either the dimensions of the third elastic cord are smaller than the dimensions of the third collar and the third elastic cord is arranged inside the third collar such that an exterior surface of the third elastic cord contacts an interior surface of the third collar, or the dimensions of the third elastic cord are greater than the dimensions of the third collar and the third elastic cord is arranged outside of the third collar such that an interior surface of the third elastic cord contacts an exterior surface of the third collar.

6. The loudspeaker arrangement of claim 5, further comprising:

a first enclosure part comprises a second collar, wherein a form of the second collar corresponds to the form of the second elastic cord, and wherein either the dimensions of the second elastic cord are greater than the dimensions of the second collar and the second elastic cord is arranged outside of the second collar such that an interior surface of the second elastic cord contacts an exterior surface of the second collar, or the dimensions of the second elastic cord are smaller than the dimensions of the second collar and the second elastic cord is arranged inside the second collar such that an exterior surface of the second elastic cord contacts an interior surface of the second collar, and a second enclosure part comprises a fourth collar, wherein a form of the fourth collar corresponds to the form of the third elastic cord, and wherein either the dimensions of the third elastic cord are greater than the dimensions of the fourth collar and the third elastic cord is arranged outside of the fourth collar such that an interior surface of the third elastic cord contacts an exterior surface of the fourth collar, or the dimensions of the third elastic cord are smaller than the dimensions of the fourth collar and the third elastic cord is arranged inside the fourth collar such that an exterior surface of the third elastic cord contacts an interior surface of the fourth collar.

7. The loudspeaker arrangement of claim 5, wherein the first collar, the second collar, the third collar, and the fourth collar have a rectangular form with rounded edges, an oval form, a round form, a rectangular form, or a square form.

8. The loudspeaker arrangement of claim 1, wherein the third projection surrounds the opening of the cavity in a plane defined by the first direction and the third direction.

9. The loudspeaker arrangement of claim 1, wherein the first loudspeaker and the second loudspeaker are arranged such that the first sound radiating surface and the second sound radiating surface are arranged substantially in parallel to each other.

10. The loudspeaker arrangement of claim 9, wherein, when a loudspeaker enclosure is arranged to enclose the first loudspeaker and the second loudspeaker, a first enclosure part and the second enclosure part exert pressure on the first elastic cord and the third projection, and the first enclosure part and a second enclosure part further exert pressure on each of the second elastic cord and the third elastic cord and on the at least one additional point of contact, thereby fixating the first loudspeaker and the second loudspeaker within the enclosure.

11. The loudspeaker arrangement of claim 10, wherein at least one of, when pressure is exerted on the first elastic cord, the first elastic cord is compressed up to a maximum of 50%; and when pressure is exerted on the second elastic cord and the third elastic cord, the second elastic cord and the third elastic cord are compressed up to a maximum of 50%.

12. The loudspeaker arrangement of claim 1 further comprising a plurality of first connection elements and a plurality of second connection elements configured to connect the first loudspeaker basket to the second loudspeaker basket.

13. The loudspeaker arrangement of claim 12, wherein at least one of;

the first elastic cord comprises an elastomer, sponge or foam rubber, or a foam material;

the second elastic cord comprises an elastomer, sponge or foam rubber, or a foam material; and the third elastic cord comprises an elastomer, sponge or foam rubber, or a foam material.

14. The loudspeaker arrangement of claim 13, further comprising a plurality of third connection elements that are configured to connect the first enclosure part to the second enclosure part.

15. The loudspeaker arrangement of claim 14, wherein the plurality of third connection elements is evenly distributed around a loudspeaker enclosure and along a contact area between the first enclosure part and the second enclosure part to equally distribute the resulting holding force along a perimeter of the enclosure.

16. A loudspeaker arrangement comprising:

a first loudspeaker comprising a first sound radiating surface and a first speaker basket, and a second loudspeaker comprising a second sound radiating surface and a second speaker basket, wherein, the first loudspeaker and the second loudspeaker are arranged opposite each other in a first direction;

the first loudspeaker and the second loudspeaker form a cavity therebetween;

the first loudspeaker basket is directly coupled to the second loudspeaker basket to form a third projection that defines an opening of the cavity;

the third projection forms a first point of contact on a first side of the loudspeaker arrangement;

the first loudspeaker basket and the second loudspeaker basket further form at least one additional point of contact at a second side of the loudspeaker arrangement, opposite the first side in a second direction, wherein the second direction is perpendicular to the first direction;

the first point of contact is configured to accommodate a first elastic cord arranged on the first point of contact to form a first closed loop in a vertical plane that is perpendicular to the second direction; and each of the at least one additional point of contact accommodate a second elastic cord and a third elastic cord such that each of the second elastic cord and the third elastic cord, when arranged on the respective additional point of contact, form a second closed loop, the second closed loop forming an opening that is arranged in a plane that is arranged at an angle of between 70° and 90° with respect to a vertical plane defined by the first direction and the second direction.

17. The loudspeaker arrangement of claim 16, wherein the first loudspeaker basket comprises a first projection extending from the first loudspeaker basket in the first direction towards the second loudspeaker; the second loudspeaker basket comprises a second projection extending from the second loudspeaker basket in the first direction towards the first loudspeaker; and the first projection is directly coupled to the second projection, thereby defining the cavity between a front side of the first loudspeaker and a front side of the second loudspeaker.

18. The loudspeaker arrangement of claim 16, further comprising:

a loudspeaker enclosure comprising a first enclosure part arranged to enclose a rear side of the first loudspeaker, and a second enclosure part arranged to enclose a rear side of the second loudspeaker and to be connected to the first enclosure part, wherein:

when the first enclosure part and the second enclosure part are arranged to enclose the first and the second loudspeaker, the third projection and each of the at least one additional point of contact are clamped between the first enclosure part and the second enclosure part.

19. The loudspeaker arrangement of claim 18 wherein the first elastic cord is mounted on the third projection to circumferentially surround the third projection, and when a first enclosure part and a second enclosure part are arranged to enclose the first and the second loudspeaker, the first elastic cord is arranged between the third projection and the enclosure.

20. A loudspeaker arrangement comprising:

a first loudspeaker comprising a first sound radiating surface and a first speaker basket, and a second loudspeaker comprising a second sound radiating surface and a second speaker basket, wherein, the first loudspeaker and the second loudspeaker are arranged opposite each other in a first direction;

the first loudspeaker and the second loudspeaker form a cavity therebetween;

the first loudspeaker basket is directly coupled to the second loudspeaker basket to form a third projection that defines an opening of the cavity;

the third projection forms a first point of contact on a first side of the loudspeaker arrangement;

the first loudspeaker basket and the second loudspeaker basket further form at least one additional point of contact at a second side of the loudspeaker arrangement, opposite the first side in a second direction, wherein the second direction is perpendicular to the first direction;

the first point of contact is configured to accommodate a first elastic cord arranged on the first point of contact to form a first closed loop in a vertical plane that is perpendicular to the second direction; and each of the at least one additional point of contact accommodate a second elastic cord and a third elastic cord such that each of the second elastic cord and the third elastic cord, when arranged on the respective additional point of contact, form a second closed loop, the second closed loop forming an opening that is arranged in a plane that is arranged at an angle that is between a first angle and a second angle with respect to a vertical plane defined by the first direction and the second direction.

* * * * *